UNITED STATES PATENT OFFICE 2,030,093

PARASITICIDES

Euclid W. Bousquet, George D. Graves, and Paul L. Salzberg, Wilmington, Del., assignors, by mesne assignments, to The Grasselli Chemical Company, Cleveland, Ohio, a corporation of Delaware No Drawing. Application December 29, 1932, Serial No. 649,448

7 Claims. (Cl. 167—22)

The present invention refers to parasiticides which comprise organic compounds containing in their molecule a straight carbon chain of 12 carbon atoms, substituted particularly at least at one of its end carbon atoms by a negative atom or a group containing such a negative atom, said carbon atom also carrying hydrogen. By negative atom we mean a non-metallic element included in groups V, VI and VII of the periodic system of elements,—in other words, the substituents consist of or comprise nitrogen, phosphorous, oxygen, sulfur, selenium, tellurium or a halogen.

These derivatives of this straight chain dodecane ($C_{12}H_{26}$) are all toxic to lower forms of life, particularly fungi, insects and more specifically soft bodied insects, and we attribute this characteristic toxicity to the hydrocarbon chain irrespective of the substituents described above which affect the toxicity only in a gradual manner.

Lauryl alcohol or dodecanol $CH_3(CH_2)_{11}OH$ has become technically available by various synthetic methods. It is quite effective for controlling soft bodied insects, such as aphids, thrips, etc.

Lauryl amine and its substitution products are similarly toxic to insects and can be used as parasiticides.

Esters of lauryl alcohol with organic or inorganic acids, particularly those containing sulfur and/or nitrogen are even more effective as insecticides than the straight lauryl alcohol.

In the case of the esters of di- or poly-basic acids with lauryl alcohol, we may use the neutral esters but we prefer to use the partial esters so that the remaining acid groups can be used for obtaining water solubility. Sodium lauryl sulfate, sodium di-lauryl phosphate, sodium lauryl xanthate, sodium lauryl mercaptide, sodium lauryl phthalate are examples of water soluble salts of partial lauryl esters which can be used in this manner.

The lauryl halogenids are regarded as esters of lauryl alcohol with hydrohalogen acids. These esters as well as the esters of lauryl alcohol with mono-basic acids are substantially water insoluble. These, as well as other water insoluble lauryl derivatives, are best used in the form of aqueous emulsions in the presence of the usual emulsifying and spreading agents, such as sulfonated vegetable, animal or mineral oils, soaps, alkylated hydrocarbon sulfonic acids, etc.

We also found that the toxicity of the lauryl group persists in a number of other derivatives in which it is combined with other elements and groups. These toxic lauryl derivatives can be represented by the type formula $$CH_3-(CH_2)_{11}-X$$

in which X is a substituent as characterized by the following four definitions:

1. X=OH, SH, SeH, TeH; OR, SR, SeR, TeR. R being an organic radical.

This includes lauryl alcohol and its ethers as well as their sulfur, selenium and tellurium analogs; also esters of organic sulfur acids as xanthates, etc.

2. X=Inorganic acid radical.

This includes lauryl chloride, bromide, fluoride, cyanide, sulfate, nitrate, phosphate, cyanate, sulfonate, etc.

3. X=—O—CO—R, the acyloxy radical.

This includes the organic lauryl esters such as lauryl formate, chloroacetate, benzoate, phthalate, etc.

4. $X=NR^1R^2$ where $R^1$ and $R^2$ may be hydrogen or an organic radical.

This includes lauryl amines, lauryl urea, lauryl guanidine, lauryl thiourea, dilauryl dithiocarbamate, etc., as well as their salts.

The toxicity of these lauryl derivatives also persists if the lauryl chain carries a negative substituent such as Cl, $SO_3H$ which does not modify the straight carbon chain character of the lauryl radical.

Instead of pure lauryl alcohol or its derivatives we may use the crude lauryl alcohol obtained by the hydrogenation of coconut oil or its free fatty acids, and the derivatives obtained from this crude alcohol. This product contains largely lauryl alcohol with small amounts of the higher or lower homologs from ctyl to cetyl alcohol, but the insecticidal value of such mixtures of alcohol or corresponding derivatives is dependent primarily on the content of lauryl derivatives.

Among the large number of toxic lauryl derivatives exemplified above we cite the following which are of great merit for controlling insect pests thriving on vegetable life and some of the results obtained by their use.

| Compound | Spreader | Insect | Percent kill |
| --- | --- | --- | --- |
| Lauryl alcohol (0.2%) | Sulfonated fish oil (0.25%). | Black chrysanthemum aphids. | 98.6 |
| Potassium lauryl xanthate | Sulfonated fish oil (0.2%). | ----do------ | 99.6 |
| Potassium lauryl xanthate (0.1%). | ----do------ | ----do------ | 95.7 |
| Lauryl amine (0.2%) | ----do------ | ----do------ | 81.5 |
| Trilauryl amine (0.2%) | Potash fish oil soap (1.0%). | ----do------ | 99.8 |
| Lauryl bromide (0.2%) | Sulfonated fish oil (0.2%). | Currant aphids. | 83.8 |
| Lauryl diethyldithiocarbamate (0.1%). | ----do------ | Black chrysanthemum aphids. | 86.6 |
| Lauryl alcohol with 10% o-cresol (0.2%). | None | Tobacco thrips. | 100.0 |

Our novel insecticides can also be used in fly sprays preferably in combination with petroleum hydrocarbons such as kerosene. Their toxic action on the common house fly is very satisfactory. In three comparable experiments we have for instance sprayed flies with kerosene, with kerosene containing pyrethrum and with kerosene containing 10% lauryl alcohol. The flies were kept under observation for 24 hours. All of the flies sprayed with kerosene recovered, whereas the pyrethrum kerosene spray gave 60% mortality and the lauryl-alcohol kerosene spray gave 65% mortality.

The outstanding advantage of our new insecticides is their high toxicity in low concentrations and their harmlessness to plant life. We have found that lauryl compounds and derivatives are unique in this respect. In view of the fact that ethyl alcohol can be applied in 100% concentration to aphids without giving complete control, it is surprising that lauryl alcohol gives excellent control at 0.2% concentration.

Similarly other long carbon chain alcohols and their derivatives have only a very mild toxic effect towards insects and other lower forms of life. We found, for instance, that primary or secondary alcohols or their derivatives containing carbon chains of less than 12 or more than 12 carbon atoms are considerably less effective than lauryl alcohol or its derivatives. Thus, for instance, while potassium lauryl xanthate at 0.2% concentration with sulfonated fish oil gave a 99–100% control on aphids, the control with potassium stearyl xanthate was only 35–40%.

We also found that mixtures of alcohols containing from 10 to 13 carbon atoms consisting mainly of secondary alcohols as produced from unsaturated petroleum hydrocarbons have very low toxicity toward lower forms of life, such as fungi and insects.

We claim:

1. A parasiticidal composition comprising as the active parasiticidal ingredient a substance selected from the group of substances consisting of lauryl alcohol, lauryl esters and lauryl amines.

2. A parasiticide comprising as an active parasiticidal ingredient a lauryl ester.

3. A parasiticide comprising as the active parasiticidal ingredient a lauryl ester of an organic acid.

4. A parasiticide comprising as the active parasiticidal ingredient a lauryl xanthate.

5. A parasiticide comprising as the active parasiticidal ingredient a compound containing a straight chain of 12 carbon atoms in which one of the end atoms carries hydrogen and a negative, non-metallic atom.

6. A parasiticide comprising as the active parasiticidal ingredient a compound containing straight chain of 12 carbon atoms in which one of the end carbon atoms carries hydrogen and a non-metallic element included in groups V, VI and VII of the periodic system of elements.

7. A parasiticide comprising as the active parasiticidal ingredient a lauryl ester of an inorganic acid.

EUCLID W. BOUSQUET.
GEORGE D. GRAVES.
PAUL L. SALZBERG.